United States Patent [19]

Schilling

[11] Patent Number: 4,957,560
[45] Date of Patent: * Sep. 18, 1990

[54] CATIONIC AQUEOUS BITUMINOUS EMULSION-AGGREGATE SLURRIES

[75] Inventor: Peter Schilling, Charleston, S.C.

[73] Assignee: Westvaco Corporation, New York, N.Y.

[*] Notice: The portion of the term of this patent subsequent to Aug. 29, 2006 has been disclaimed.

[21] Appl. No.: 324,106

[22] Filed: Mar. 16, 1989

Related U.S. Application Data

[63] Continuation of Ser. No. 182,874, Apr. 18, 1988, Pat. No. 4,861,377.

[51] Int. Cl.$^5$ ............................................. C08L 95/00
[52] U.S. Cl. .................. 106/277; 106/284.4; 106/273.1; 106/243; 106/246; 252/311.5; 252/355; 252/357
[58] Field of Search .................. 106/277, 284.4, 273.1, 106/243, 246; 252/311.5, 355, 357

[56] References Cited

U.S. PATENT DOCUMENTS

| | | | |
|---|---|---|---|
| 3,230,104 | 1/1966 | Falkenberg et al. | 106/277 |
| 3,518,101 | 6/1970 | Gzemski et al. | 252/311.5 |
| 3,997,354 | 12/1976 | Pivette et al. | 106/277 |
| 4,478,642 | 10/1984 | Schilling et al. | 106/277 |
| 4,494,992 | 1/1985 | Schilling et al. | 106/277 |
| 4,547,224 | 10/1985 | Schilling | 106/277 |
| 4,561,901 | 12/1985 | Schilling | 106/277 |
| 4,810,299 | 3/1989 | Schilling et al. | 106/277 |
| 4,861,337 | 8/1989 | Schilling | 106/277 |

*Primary Examiner*—William R. Dixon, Jr.
*Assistant Examiner*—Helene Klemanski
*Attorney, Agent, or Firm*—Terry B. McDaniel; Richard L. Schmalz

[57] ABSTRACT

Cationic aqueous bituminous emulsion-aggregate slurries are disclosed to be formed with cationic emulsions prepared at elevated temperatures by emulsifying bitumen, such as an asphalt, in water with a cation-active emulsifier which is the product of the reaction of modified polyamine with certain polycarboxylic acids and anhydrides. The modified polyamides are obtained by reacting suitable polyalkylene amines with 1,2-unsaturated acids, able to undergo Michael addition of the amines across the double bonds resulting in amino acids which can undergo polymerization to low and high molecular weight amino polyamides.

4 Claims, No Drawings

CATIONIC AQUEOUS BITUMINOUS EMULSION-AGGREGATE SLURRIES

This is a continuation of application Ser. No. 182,874, filed Apr. 18, 1988, now U.S. Pat. No. 4,861,377.

BACKGROUND OF THE INVENTION

(1) Field of the Invention

The present invention relates to mixing-grade, quick-setting and slow-setting cationic aqueous bituminous emulsion-aggregate paving slurry seal mixtures. More particularly, this invention relates to slurries formed with cationic emulsions prepared by emulsifying bitumen, such as an asphalt, in water with a cation-active emulsifier which is the product of the reaction of modified polyamine with certain polycarboxylic acids and sulfonated carboxylic acids.

(2) Description of the Prior Art

Conventionally, emulsion slurry seals are formulated from (1) mineral aggregate which is a fine stone aggregate and/or mineral filler and (2) about 15% to about 25% by weight thereof of a mixing-grade, quick-setting or slow-setting emulsion containing from about 50% to about 75% by weight of bituminous residue (usually asphalt), with a further addition of about 5% to about 25% of water, based on the weight of the dry aggregate, to attain slurry consistency. Usually, densely-graded aggregates, such as granite screenings, limestone screenings, dolomite screenings and blast furnace slag, are combined with bituminous emulsions to produce slurry seal compositions. These aggregates range in size from anything passing all through a sieve of No. 4, and even No. 10 mesh, with from 15% to 20% passing through as fine a mesh as 200 mesh, as described in ASTM C136.

The advent of slurry seal as a paving and road maintenance technique was first developed for use with anionic aqueous bituminous emulsions. A slurry seal is an intimate mixture of emulsified bituminous material and fine-grained aggregate held in suitable suspension until applied to the road surface. The slurry seal emulsion must be of an oil-in-water type. In such a mixture with aggregate, the aqueous emulsion form of the bituminous material has been generally preferred because it is less hazardous and more economical to use than hot mix or cutback (solvent containing) asphalts. Further, the aqueous emulsion form can be stored, transported and applied at much lower temperatures, obviating the necessity of heating equipment to maintain a bitumen-aggregate system in a workable or usable form. While these advances have been recognized, widespread acceptance has not been achieved due to disadvantages found in previous aqueous bituminous emulsions.

More recently, cationic bituminous emulsions have come into use and eliminate many of the disadvantages of the anionic emulsions. Bituminous emulsions formulated using cationic emulsifiers do not "break" in the same manner as anionic emulsions, but rather the bituminous material is deposited from the emulsion due to the attraction of polar charges between the positively charged bituminous droplets and negatively charged aggregate surfaces. Thus, cationic bituminous emulsions deposit more rapidly than the anionic bituminous emulsions on aggregate surfaces and are bonded to the aggregate by the electrostatic action at the interface of the bitumen and the aggregate material.

The aqueous cationic bituminous emulsions themselves are relatively stable, and the emulsion stability may be enhanced by various additives well known in the art. Most cationic bituminous emulsions, however, deposit on the surface of aggregate materials rapidly when aggregate is contacted with the emulsions. Bitumen from an aqueous cationic bituminous emulsion is deposited from the emulsion due to the charge attraction between the bituminous droplets and the aggregate materials. The rapid setting action of cationic bituminous emulsions is of considerable advantage in road building, such as seal coats, since the roads can be opened to traffic shortly after application of the coating. Although the rate of asphalt deposition, for example, from the emulsion can be controlled to some extent, the time required for complete deposition is never very long and it is therefore the practice to combine the cationic emulsion with the aggregate at the site of road construction, either on the surface of the road itself, or in a mobile mixer which permits the emulsion aggregate mix to be rapidly spread. Due to the charge attraction mechanism, the rapidity of deposition of bituminous materials from the cationic emulsion is closely related to the generally negatively charged surface area of the aggregate or filler material. Thus, while a specific cationic bituminous emulsion might provide suitable properties for use in conjunction with some aggregates, the same cationic emulsion may not exhibit suitable properties when used with very finely ground materials having vastly larger total surface area. The rapid deposition characteristics of the cationic bituminous emulsions frequently makes it impossible to use such emulsions with fine-grained aggregate in slurry form such as in gun application or spreader box application. Therefore, since the slurry seal should mix well, pump well, lay down well, not stiffen while being applied, and, after setting, wear well under traffic, it is particularly desirable to be able to control the setting time of the slurry for various aggregates employed.

Acidified reaction products of the above described polycarboxylic acids, anhydrides, sulfonated fatty acids and epoxidized glycerides with certain polyamines are suitable emulsifiers yielding asphalt emulsions which can be mixed with fine grained aggregate to give workable aggregate/emulsion mixes.

These types of emulsifiers are disclosed in U.S. Pat. No. 4,447,269 to Schreuders et al., U.S. Pat. No. 4,450,011 to Schilling et al., U.S. Pat. No. 4,547,224 to Schilling et al., U.S. Pat. No. 4,462,890 to Schilling et al., U.S. Pat. No. 4,464,286 to Schilling, U.S. Pat. No. 4,561,901 to Schilling, U.S. Pat. No. 4,597,799 to Schilling, and U.S. Pat. No. 4,676,927 to Schilling et al.

However, cationic emulsions produced with the emulsifiers can only be mixed with aggregates when the temperature of the emulsion or the aggregate is below 100° F. or when the aggregate surfaces are only moderately charged. In hotter climates where the temperature of the mixes are as high as 120° F. and when highly charged aggregates have to be used, these emulsions fail the mixing process.

Accordingly, an object of this invention is to provide novel emulsifiers which produce emulsions which can be mixed with aggregate at elevated temperatures.

A further object of this invention is to provide a novel mixture of aggregate and bituminous emulsion.

An additional object is to provide a mixture of the above character which is workable under a broad range of conditions.

Another object is to provide a mixture of cationic bituminous emulsion and aggregate with variable setting time.

A particular object is to provide an aqueous bituminous emulsion and fine-grained aggregate slurry mixture which deposits at a fairly rapid rate after being applied to the surface to be treated, and is usable for a longer period of time to enable application in slurry form.

SUMMARY OF THE INVENTION

The above objectives are met in the cationic aqueous bituminous emulsion-aggregate slurries formed with cationic emulsions prepared by emulsifying bitumen, such as an asphalt, in water with a cation-active emulsifier which is the product of the reaction of modified polyamine with polycarboxylic acids and anhydrides of the following general formulae.

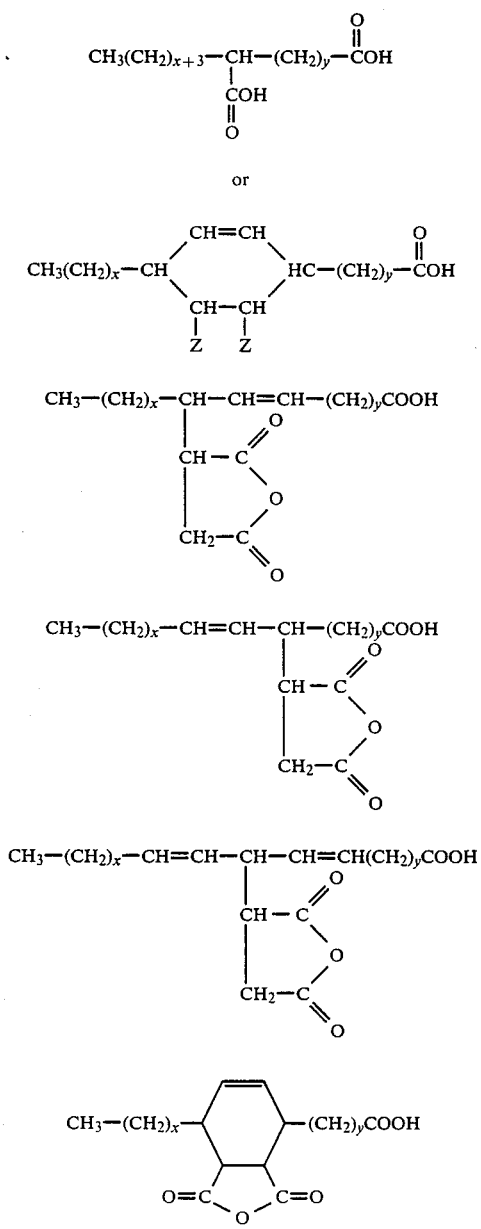

wherein x and y are integers from 3 to 9, x and y together equal 10–14, at least one Z is a carboxylic acid group and any remaining Z is hydrogen.

Additional new cation-active emulsifiers are reaction products of modified polyamines with a member of the group consisting of sulfonated fatty acids, resin acids (rosin) reacted with maleic anhydride or fumaric acid, and epoxidized esters of unsaturated fatty esters such as tallates, oleates, linoleates, and glycerides such as vegetable oils and animal fats. Examples of this group include the following structures:

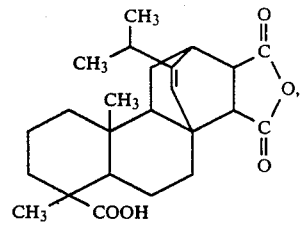

Maleinized Rosin

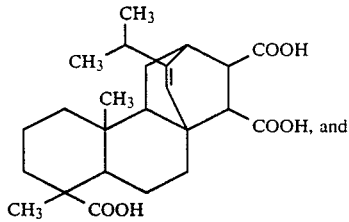

Fumarized Rosin

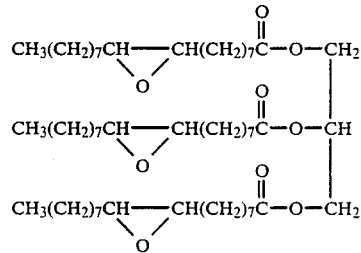

Epoxidized Glyceride

The modified polyamines are obtained by reacting suitable polyalkylene amines with 1,2-unsaturated acids, able to undergo Michael addition of the amines across the double bonds resulting in amino acids which can undergo polymerization to low and high molecular weight amino polyamides.

DESCRIPTION OF THE PREFERRED EMBODIMENTS

A typical cationic aqueous bituminous emulsion aggregate slurry is formulated in the laboratory with an amount of aggregate pre-wetted with water and mixed with a suitable cationic bituminous emulsion to a desired consistency. Suitable consistency is obtained by using mixed gradations of aggregates forming a smooth non-separating uniform mixture of cationic aqueous bituminous emulsion-aggregate which can be evenly spread onto an existing surface. The ultimate toughness of the applied slurry is obtained as the bitumen, such as asphalt, deposits on the aggregate particles and binds the newly applied coating to the pre-existing surface as a mixture of asphalt cement and aggregate.

As a paving technique at the roadside, a mobile self-propelled unit capable of uniformly metering the aggregate, water, inorganic or organic additive and emulsion components may be used. A typical unit is equipped with separate tanks for aggregate, water, additive and emulsion which are continually metered into a mixing chamber at a pre-determined ratio. The continually fed components are retained in the mixing chamber for approximately one minute and then fed into a spreader box and applied to the surface to be coated. Batch operated pneumatic devices can also be used for suitable placement of the cationic bituminous aggregate slurries of this invention.

The slurry of this invention broadly comprises aggregate and a bituminous emulsion made up of bitumen, water and, as cationic emulsifier, the invention reaction product of a modified polyamine and a polycarboxylic acid as described above.

When the emulsifiers are the reaction products of the modified polyamines with sulfonated carboxylic acids derived by sulfonation of tall oil fatty acid and oleic acid, the sulfonated products are characterized by an acid number from about 220 to 330, saponification number from about 300 to 360.

The sulfonation of oleic acid with sulfur trioxide in liquid sulfur dioxide is disclosed in U.S. Pat. No. 2,743,288.

British Pat. No. 1,278,421 discloses the sulfonation of oleic acid with gaseous sulfur trioxide diluted with an inert gas with a continuously formed liquid film of the unsaturated fatty acid.

The sulfonation of tall oil fatty acid is also disclosed in the above mentioned patents. Because of the complexity of the composition of tall oil fatty acids, no attempt to identify the sulfonated products was made.

Reaction mechanism and all aspects of sulfonation are reviewed in E. E. Gilbert, "Sulfonation and Related Reactions," R. E. Krieger Publishing Company, Huntington, N.Y., 1977.

Suitable emulsifiers are also obtained when the modified polyamines are condensed with reaction products of animal fats and vegetable oils and fumaric acid, maleic anhydride, acrylic acid or metacrylic acid or the epoxidized derivatives of soybean oil, linseed oil, of esters such as alkyl oleates or alkyl tallates or animal fats obtained by epoxidation with peracetic acid or perbenzoic acid. These oxiranes are most widely used as plasticizers and stabilizers for polyvinyl chloride or as co-reactants for epoxy resins. Epoxy acids or esters can also be derived from fatty chlorohydroxy acids or esters. As an example, the expoxidized triglyceride of oleic acid may be used to describe an ingredient of the emulsifiers of the invention:

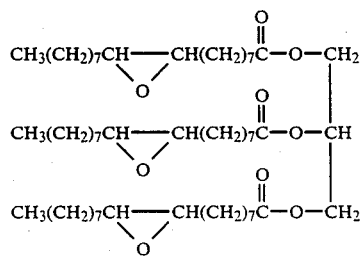

Other suitable polycarboxylic acids are obtained by the reaction of resin acids (rosin) with fumaric acid, maleic anhydride, acrylic acid or metacrylic acid yielding:

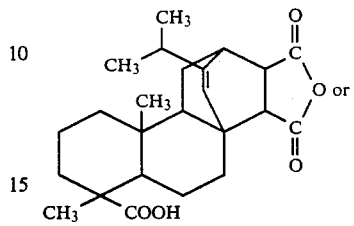

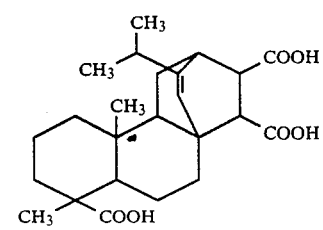

Unlike the polyamines employed to form the prior art bituminous emulsion emulsifiers, the invention modified polyamines are obtained by reacting suitable polyalkylene amines with 1,2-unsaturated acids, able to undergo Michael addition of the amines across the double bonds resulting in amino acids which can undergo polymerization to low and high molecular weight amino polyamides. These types of reaction products are visualized with the simplest amine and unsaturated acid namely ethylene diamine and acrylic acid as follows:

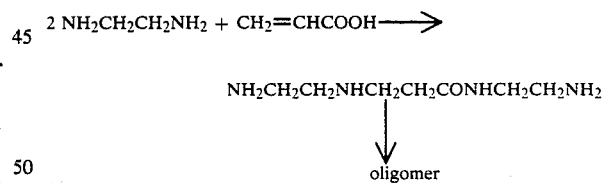

Similar polyamine amides are obtained by reacting a polyamide with a haloalkane carboxylic acid, such as chloroacetic acid.

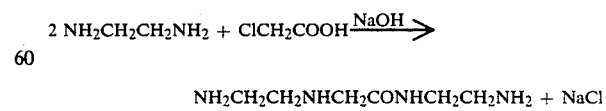

Upon adding of the proper amounts of these low molecular weight aminoamides to the $C_{21}$-dicarboxylic acid, which is used as a general example, at 230°–250° C., a polyaminoamido amine is formed as follows:

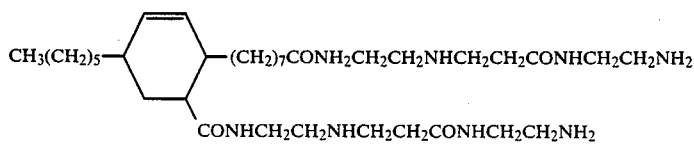

or

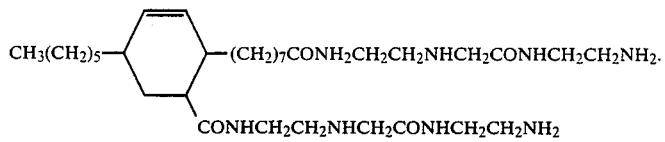

These products are, however, never obtained in high purity, since the reaction of two moles polyamine with one mole reactive acid is rather complex and some unreacted amine and higher molecular weight polyamino amides are formed as by-products with the monoamides described above.

Polyamines suitable as precursors are those which are able to form imidazolines or amidoamines with carboxylic acids such as ethylene diamine, diethylene triamine, triethylene tetramine, tetraethylene pentamine, pentaethylene hexamine, and higher homologues; N-aminoethyl propane diamine, N,N'-diaminoethyl propane diamine and the N-aminoethyl- or N,N'-diaminoethyl-substituted butane diamines, pentane diamines and hexane diamines, and N-hydroxy ethyl ethylene diamine. These compounds have the general formula $$H_2NCH_2CH_2NHR$$

R=H—, CH$_3$—, C$_2$H$_5$—, C$_3$H$_7$—, —CH$_2$CH$_2$OH, —(CH$_2$CH$_2$NH)$_x$H x=1, 2, 3, 4, . . . 10 or, R$_1$R$_2$N(CH$_2$)$_y$NHR$_3$
R$_1$=H—, CH$_3$—, C$_2$H$_5$—, C$_3$H$_7$—, NH$_2$CH$_2$CH$_2$—,
R$_2$=H—, CH$_3$—, C$_2$H$_5$—,
R$_3$=H—, CH$_3$—, C$_2$H$_5$—, C$_3$H$_7$—, NH$_2$CH$_2$CH$_2$—,
y=2, 3, 4, 5, 6.

Amines capable of forming amidoamines but not imidazolines are: 1,3-diaminopropane, 1,4-diaminobutane, 1,5-diaminopentane, 1,6-diaminohexane, piperazine (1,4-diazacyclohexane), N-aminoethylpiperazine, N-hydroxyethyl piperazine, N-aminopropyl-propane diamine-1,3, N-methyl-N-aminopropylpropane diamine-1,3, N-aminohexylhexane diamine-1,6.

In addition, polyamines containing other functionalities such as (—O—), thioether (—S—), sulfoxide (—SO—) sulfone (—SO$_2$—) groups, as well as aromatic structures are also suitable for condensation.

$$R_1H_2N(CH_2)_xY(CH_2)_zNH_2$$

Y=O, S, SO, SO$_2$, C$_6$H$_4$
x=2-10
Y=2-10

Further modification of the above described polyamino amidoamines are their reaction products with reactive oxirane systems such as ethylene oxide, propylene oxide or butylene oxide. Reaction occurs initially on primary and secondary nitrogens, that is, a nitrogen to which one or two hydrogen atoms are covalently bound. The reaction products belong to the class of N-hydroxyethyl-, N-2-hydroxypropyl- and N-2-hydroxy butylamino amidoamines. If excess oxirane is reacted, polyethylene oxides, polypropylene oxides or polybutylene oxides are obtained. The hydroxyl groups will also react in this case.

Another modification may involve the use of an alkylating agent such as methyl-, ethyl-, or benzyl halides, sulfates, phosphates, etc. The resulting compounds are classified as mono-, di-, or triquaternary ammonium salts. Their main characteristic is their solubility in aqueous systems without addition of acid, as is the case with amines, amidoamines. The use of reactive products of polyamino amidoamines with the above described C$_{19}$-, C$_{21}$-, C$_{22}$-polycarboxylic acid and anhydrides as well as with maleinized or fumarized (rosin) resin acids, sulfonated fatty acids or epoxidized glycerides as asphalt emulsifiers, and specifically as emulsifiers for solvent less asphalt emulsions and emulsions for slurry seal applications, was heretofore unknown.

The examples which follow are illustrative of emulsifiers used to obtain cationic asphalt in water emulsions eminently useful for mixing under shear with a variety of siliceous and calcareous aggregates. After setting (evaporation of water), the asphalt films show excellent adhesion to the aggregate surface.

In preparing the bituminous emulsions employed in the invention paving slurry seal mixtures, an aqueous acidic solution of the emulsifiers described below is intimately mixed under high shear in a colloid mill. The bitumen content can range from 30% to about 80% by weight, preferably between 60% and 70%. The dosage of the emulsifier can range from 0.1-10% by weight of the emulsion, preferably between 0.5-2% by weight of the emulsion. Dependent on the emulsifier, a slurry grade emulsion is obtained in a pH range of 2-7, with the optimum performance at a pH of about 2.5.

The "bitumen" used in the emulsion may be derived from domestic or foreign crude oil; it also includes bitumen, natural asphalt, petroleum oil, oil residue of paving grade, plastic residue from coal tar distillation, petroleum pitch, and asphalt cements diluted from solvents (cutback asphalts). Practically any viscosity or penetration graded asphalt cement for use in pavement construction as described in ASTM designation D-3381 and D-946 may be emulsified with the aid of the emulsifiers of this invention.

The cationic soap solutions are normally obtained by suspending the amidoamine or imidazoline in water to which a sufficient amount of a suitable acid, for instance, hydrochloric, sulfuric, and phosphoric acid or the like is added until the desired pH value below 7 is reached and a clear emulsifier solution is obtained. Thereafter, the soap solution which is preheated to 55° C. and the fluid asphalt which is preheated to 120°-125°

C. are mixed under high shear in a colloid mill to give asphalt emulsions of brown color and creamy texture. Prior to testing according to ASTM D-244, the emulsions are stored at 70° C. for 16 hours.

The aggregates of the invention paving slurry seal mixtures are densely graded aggregates which range in size from anything passing through a No. 4 sieve and at least 80% retained on 200 mesh.

Aggregate mixing tests are performed by mixing the aggregate with water and aqueous bituminous emulsion. An inorganic additive-mineral filler, such as portland cement, hydrated lime, limestone dust and fly ash, may be added to accelerate set/break time and organic salts, such as ammonium sulfate, or emulsifiers may be added to retard the set/break of the slurry system. Such additives shall comply with the requirements of ASTM D-242. The materials are mixed in a mixing bowl until a homogeneous slurry mixture is obtained. The inability to form a stable slurry within 3 to 4 minutes of mixing time when proper proportions of each ingredient are used would indicate a mixture in which the materials are not compatible. This mix design is necessary to simulate field conditions. After the slurry is mixed, it is spread in a mold which is placed on an asphalt felt, and the set/break time is measured by blotting the exposed slurry surface with a paper towel, the slurry is considered to be "set." The cure time could also be measured with a cohesion testing device. Many other tests such as described in ASTM D-3910 are used to measure strength and other physical properties of slurry. The Performance Guide for Slurry Seal published by the Asphalt Emulsion Manufacturers Association is used to measure the performance of the slurry seal.

The emulsion should be stable during mixing and should set within the designed time period following application. The emulsifiers of this invention perform very satisfactorily without auxiliary emulsifiers. For instance, the setting times can be controlled with the concentration of emulsifier, the addition of lime, cement or other inorganic additive or an organic additive, which would alter the break characteristics of the slurry system. An organic additive-polymer latex may also be employed to strengthen the matrix. The organic additive is preferably added to the emulsion-aggregate slurry.

Either a mixture of tall oil fatty acids, preferably tall oil pitch, can be added to the bitumen (asphalt) prior to emulsification to control break time or improve the viscosity of the emulsion, or blends of the above described amidoamines with compatible cationic or nonionic emulsifiers may be used for the emulsification of the bitumen. Auxiliary emulsifiers, which may constitute up to 90% of the total combined emulsifier formulation, are fatty amines, fatty propane diamines, fatty amidoamines, and fatty imidazolines. Others are fatty monoquaternary ammonium salts and fatty diquaternary diammonium salts and nonionic emulsifiers, such as ethylene glycol polyethers of nonyl- or dodecyl phenol. Combinations of amidoamines based on fatty monocarboxylic acids, of various sources and the $C_{19}$- and $C_{21}$-dicarboxylic acids or $C_{22}$-tricarboxylic acid or anhydrides disclosed in this invention can also be obtained by reacting the modified polyamines with a blend of fatty monocarboxylic acids and di- or tricarboxylic acids or anhydrides. Monocarboxylic acids suitable for this purpose are tall oil fatty acids, crude tall oil, rosin acids, tall oil pitch, tallow fatty acids, soya fatty acids and the like. Kraft lignin, oxidized lignin, desulfonated sulfite lignin or Vinsol may also be co-reacted.

Dimer acids, which are long chain $C_{36}$-aliphatic carboxylic acids obtained by dimerization of fatty acids of various sources, may be also co-reacted. An example of this type of acid is produced by Emery Industries, Inc. under the trade name "Empol ® Dimer Acids."

In a similar way, blends of sulfonated fatty acids as well as fumarized or maleinized rosin (resin acids) or epoxidized glycerides or other esters, with the above described co-reactants (fatty acids, oils, fats, lignins, Vinsol, dimer acid) can be reacted with the modified polyamines to give combinations of polyaminoamidoamines.

The emulsions prepared with these polyaminoamide condensates disclosed in this invention are stable and can be stored for a long period of time until required for use. The cationic aqueous bituminous emulsions employed in the invention slurries are slow-setting, mixing grade slurries under ASTM D-2397; however, the set time may be shortened by adding lime or cement, providing an emulsion with quick-setting characteristics.

The practice of this invention may be seen in the following examples wherein the preparation of various types of slurries of the invention is described.

EXAMPLE 1

The following variety of emulsifiers were prepared for emulsion-aggregate slurry testing.

Emulsifier A

A one-liter three-necked flask equipped with stirrer, condenser, Dean Stark trap, thermometer and dropping funnel was charged with 80 g polyethyleneamine blend with an average molecular weight of approximately 140. With good stirring, 20 g acrylic acid was added slowly (exothermic reaction) and heated at 150° C. for 10 minutes. One-hundred grams of $C_{21}$-dicarboxylic acid (DIACID 1550 ®) was added through the dropping funnel and heating was resumed until the reaction mixture reached 240° C. After all the condensate was collected, it was cooled and the emulsifier discharged.

EMULSIFIER B

To 90 g of a well-stirred blend of polyethyleneamines with the average molecular weight of approximately 140, 10 g maleic anhydride was added in small portions and heated to 150° C. One-hundred grams of $C_{21}$-dicarboxylic acid (DIACID 1550 ®) was added to the polyamino polyaminoamidoamine mixture and heating resumed to 240° C. After all the distillate was collected, it was cooled and discharged. To lower the viscosity of the emulsifier, it was diluted with i-propanol.

EMULSIFIER C

To 80 g of a well stirred blend of polyethylene amines with the average molecular weight of approximately 140, 20 g of fumaric acid was added in small portions and heated. When 180° C. was reached, 100 g of $C_{21}$-dicarboxylic acid was added and heating resumed to 240° C. After all the distillate was collected, it was cooled and discharged.

EMULSIFIER D

To 80 g of a well stirred blend of polyethyleneamines with the approximate average molecular weight of 140 was added 20 g methacrylic acid and heated to 150° C. At this temperature, 100 g $C_{21}$-dicarboxylic acid was added and heating resumed to 240° C. After all the distillate was collected, it was cooled and diluted with i-propanol and discharged.

EMULSIFIER E

To 100 g of a well stirred blend of polyethyleneamine with an approximate molecular weight of 140 was added 20 g of acrylic acid drop-wise. It was heated to 150° C. and 100 g of a blend consisting of 60% fatty monocarboxylic acid mainly oleic acid and elaidic acid) and 40% $C_{22}$-tricarboxylic acid (reaction product of conjugated linoleic acid with fumaric acid) was added and heated to 240° C. After all the distillate was collected, it was cooled and discharged.

EMULSIFIER F

To 150 g of well stirred blend of polyethyleneamines with the average molecular weight of approximately 140, 30 g of acrylic acid was added slowly and heated to 150° C. One-hundred grams of crushed fortified rosin, obtained by reacting rosin with 15% by weight of fumaric acid was added slowly and the reaction mixture was heated to 240° C. After all the condensate was collected, it was cooled and diluted with ethylene glycol to lower the viscosity of the emulsifier.

EMULSIFIER G

To 100 g of a well stirred blend of polyethyleneamines with the average molecular weight of 140, 20 g of acrylic acid was added slowly and heated to 150° C. To this polyaminoamidoamine blend, 150 g tall oil fatty acid L-5 was added and heated to 240° C. After all the distillate was collected, it was cooled and discharged.

EMULSIFIER H

To 280 g soya oil, 50 g maleic anhydride was added and heated to 200° C. for four hours. The reaction mixture was cooled to 150° C. and 100 g ethylene glycol was added. It was cooled further to room temperature. With good stirring, 350 g of a blend of polyethyleneamines with an average molecular weight of 140 and 80 g acrylic acid was added and heated to 150° C. for one hour. Then the temperature was raised to 200° C. and until all the condensate was collected, it was cooled and the emulsifier discharged.

EMULSIFIER I

One-hundred grams of sulfonated tall oil fatty acid with an acid number of 330 and 150 g of a blend of polyethyleneamines with the average molecular weight of 140 were mixed at room temperature. To this mix, 30 g of acrylic acid was added slowly with good stirring, and heated to 200° C. until all the distillate was collected. After cooling to 140° C., water was added to lower the viscosity of the emulsifier.

EMULSIFIER J

One-hundred grams of a polyethyleneamine blend with the average molecular weight of 140 was slowly mixed with 30 g of acrylic acid and heated to 150° C. When this temperature was reached, 100 g epoxidized soybean oil (Flexol® EPO) was added and heated to 200° C. After all the condensate was collected, it was cooled and discharged.

EMULSIFIER K

To 800 g of a polyethyleneamine blend with an average molecular weight of 140 was added 30 g chloroacetic acid and heated to 140° C., 100 g $C_{21}$-dicarboxylic acid (DIACID 1550®) and heated further to 240° C. until all the distillate was collected. It was cooled and i-propanol added to lower the viscosity of the emulsifier.

EMULSIFIER L

To 100 g commercial emulsifier (INDULIN-MQK®), 10 g of acrylonitrile was added and heated one hour at 90° C.

EMULSIFIER M

To 100 g commercial emulsifier (INDULIN-MQK®), 10 g of propyleneoxide was added and heated at 70° C. for two hours.

EMULSIFIER N

To 300 g of Tall Oil Pitch (Acid Number 30), 60 g maleic anhydride was added and heated at 200° C. for four hours. One-hundred grams of ethylene glycol were added to the reaction product and blended with 300 g of a polyethyleneamine blend with the average molecular weight of 140 and heated to 240° C. until all the condensate was collected.

EMULSIFIER O

To 562.5 g polyethyleneamine blend (MW 140), 112.5 g acrylic acid were slowly mixed at room temperature and heated to 150° C. To this blend, 360 g of the tall oil pitch - maleic anhydride condensate (as described under Emulsifier N) diluted with 225 g diethylene glycol was added and heated to 240° C. After all the condensate was collected, it was cooled and discharged.

EMULSIFIER P

One-hundred fifty grams of a polyethyleneamine blend with the average molecular weight of 140, was heated to 120° C. and 75 g kraft lignin (REAX 27®) was added. The temperature was raised to 180° C. whereby condensation occurred and water distilled into the Dean Stark trap. After 20 minutes, 75 g of the tall oil pitch - maleic anhydride condensate as described under Emulsifier N was added and heated to 240° C. until the formation of condensate (water) ceased.

EMULSIFIER Q

To 150 g of a polyethyleneamine blend with the average molecular weight of 140, 30 g of acrylic acid was added and heated to 150° C. When this temperature was reached, 60 g of kraft lignin was added and heated to 180° C. At this temperature, 60 g of a tall oil pitch-maleic anhydride condensate (as described under Emulsifier N) was added and heated to 240° C. After all the condensate was collected, it was discharged.

EMULSIFIER R

This emulsifier was prepared in the same way as Emulsifier Q, but instead the tall oil pitch-maleic anhydride condensate, unmodified tall oil pitch was used.

EMULSIFIER S

To 150 g of a polyethyleneamine blend with the average molecular weight of 140 30 g acrylic acid was added slowly and heated to 130° C. At this temperature, 60 g of kraft lignin (REAX 27®) was added slowly and heated to 180° C. were upon water was formed. After most of the water was collected, 60 g of $C_{21}$-dicarboxylic acid (DIACID 1550®) was added and heated to 240° C. After all the condensate was collected, it was cooled to 150° C. and enough ethylene glycol added that the viscosity of the emulsifier remained low at ambient temperatures.

EMULSIFIER T

This emulsifier was prepared in the same way as Emulsifier S, but instead of $C_{21}$-dicarboxylic acid, a 60:40 mixture of tall oil fatty acids, consisting mainly of oleic acid and elaidic acid and $C_{22}$-tricarboxylic acid was used as fatty acids.

EMULSIFIER U

This emulsifier was prepared in the same way as emulsifier S, but instead of $C_{21}$-dicarboxylic acid, the same amount of fortified rosin, obtained by heating resin with 15% fumaric acid by weight at 220° C. was used as ingredient.

EMULSIFIER V

To 150 g of a blend of polyethyleneamines with the average molecular weight of 140, 20 g of acrylic acid was added at room temperature and heated to 150° C. At this temperature, 50 g of VINSOL® was added slowly and the temperature was raised to 180° C. whereupon water was formed. After most of the water was collected, 100 g of $C_{21}$-dicarboxylic acid (DIACID 1550®) was pumped into the reaction mixture and heating resumed to 240° C. After all the condensate was collected, it was cooled and discharged.

EMULSIFIER W

This emulsifier was prepared in the same way as Emulsifier S, but instead of $C_{21}$-dicarboxylic acid, a reaction product of maleic anhydride with a blend of oleic acid and elaidic acid prepared at a weight ratio of 75:280 at 200° C. was used as ingredient.

EXAMPLE 2

A cationic aqueous bituminous emulsion was prepared employing each of the emulsifiers of Example 1 and aggregate mixing tests were preformed with each emulsion as previously described.

First, cationic aqueous bituminous emulsions were prepared with 64% Exxon® asphalt (penetration value of 125/150) and Edgington Hard Base AC-20 asphalt at 60° C., 1.5% emulsifier at pH 2.5 and water to make up 100% (percentages based on the weight of the emulsion).

Next, slurries were prepared by adding to one hundred-grams of Camak aggregate (granite screenings) 16% of the cationic aqueous bituminous emulsion, 10% water and either 0% or 2% portland cement as set accelerator (percentages based on the weight of the aggregate) and mixing in a bowl for one minute. Mineral aggregate, water, and emulsions were pre-heated at 120° F. for one hour.

For all improved emulsifiers tested, stable homogeneous slurry mixtures were achieved within one minute of mixing time. Slurries mixture which broke within one minute mixing times were obtained with the control emulsifiers.

EXAMPLE 3

This example illustrates mixing behavior, the set times and the aggregate coating performance of the slurries prepared in Example 2. The slurry set times were determined by the test procedures previously described, i.e., by blotting with a paper towel the exposed surface of the slurry spread in a mold on an asphalt felt. If no brown stain is transferred to the paper, the slurry is considered set. The aggregate coating performance was determined by heating the slurry mix in water for 10 minutes after it was cured at ambient temperature for 24 hours. These properties are shown in the following tables.

TABLE I

PROPERTIES OF SLURRY SEAL MIXES
Emulsion: Edgington Hard Base, 64% Asphalt Content, pH 2.5, 1.5% Emulsifier
Aggregate: Camak (Granite)
Mixing Conditions: 120° F., 10 g Water, 16 g Emulsion, 100 g Aggregate

| Emulsifier | Mixing Time (min) | Set Time (min) | % Coating[a] |
|---|---|---|---|
| INDULIN-MQK ® | 5 sec[b] | — | — |
| Emulsifier A | 1 | 60+ | 90 |
|  | 1[c] | 15[c] | 90[c] |
| Emulsifier B | 1 | 60+ | 90 |
| Emulsifier C | 1 | 60+ | 95 |
| Emulsifier D | 1 | 60+ | 85 |
| Emulsifier E | 1 | 60+ | 85 |
| Emulsifier F | 1 | 60+ | 85 |
| Emulsifier G | 5 sec[b] | — | — |
| Emulsifier L | 1 | 60+ | 95 |
|  | 1[c] | 50[c] | 98[c] |
| Emulsifier M | 1 | 60+ | 95 |
|  | 1[c] | 20[c] | 95[c] |

[a] Determined by boiling the slurry mix in hot water for 10 min., after curing for 24 hrs. at room temperature.
[b] Mix broke after 5 seconds.
[c] 2 g Cement was added to the aggregate before mixing.

TABLE II

PROPERTIES OF SLURRY SEAL MIXES
Emulsion: Exxon Asphalt 120/150 Penetration; 64% Asphalt Content, pH 2.5, 1.5-2.0% Emulsifier
Aggregate: Camak (Granite)
Mixing Conditions: 120° F., 10 g Water, 16 g Emulsion, 100 g Aggregate

| Emulsifier | Concentration % | Mixing Time (min) | Set Time (min) | % Coating[a] |
|---|---|---|---|---|
| Emulsifier N | 2.0 | 1 or 2 | 60+ | 90 |
| Emulsifier O | 2.0 | 2 | 60+ | 90 |
| INDULIN-MQK ® | 1.5 | 5 sec[b] | — | — |
| Emulsifier P | 1.5 | 40 sec[b] | — | — |
| Emulsifier Q | 1.5 | 1 | 60+ | 80 |
| Emulsifier R | 1.5 | 15 sec[b] | — | — |
| Emulsifier S | 1.5 | 1 | 60+ | 75 |
| Emulsifier T | 1.5 | 1 | 60+ | 80 |
| Emulsifier V | 1.5 | 1 | 60+ | 75 |

[a] Determined by boiling slurry mix in water for 10 min. after curing at room temperature for 24 hours.
[b] Mix broke prematurely before one minute mixing time was reached.

What is claimed is:

1. A method of forming a bituminous emulsion at a temperature above 100° F. comprising from about 30% to about 80% by weight of bitumen, from about 0.1% to about 10% by weight of an emulsifier obtained by reacting a modified polyamine, formed by a Michael addition reaction of a polyalkylene polyamine with a 1,2-unsaturated acid, with a member of the group consisting of polycarboxylic acids and anhydrides of the following general formulae:

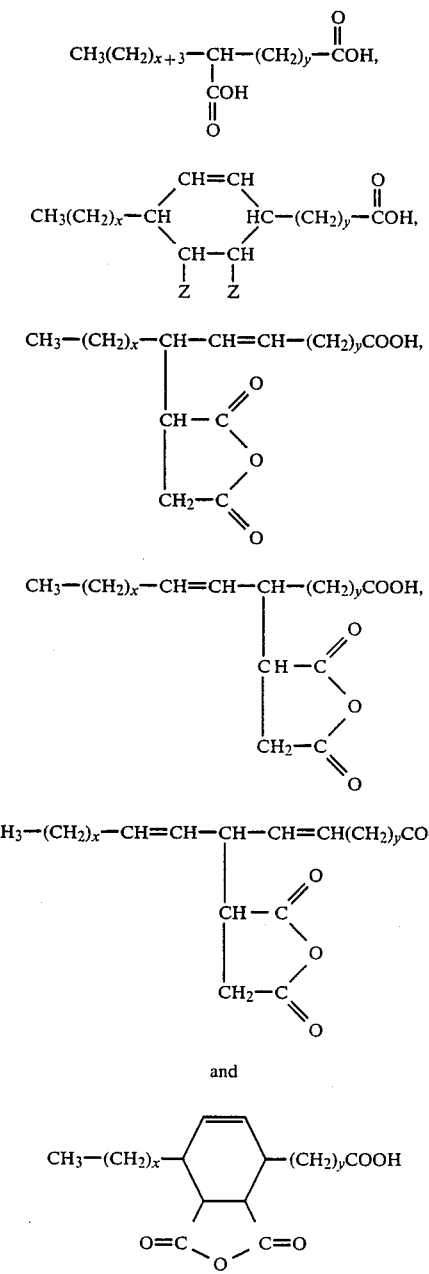

wherein x and y are integers from 3 to 9, x and y together equal 10–14, at least one Z is a carboxylic acid group and any remaining Z is hydrogen, and water to make up 100% by weight.

2. The method of claim 1 wherein the emulsifier is obtained by co-reacting the member with kraft lignin, desulfonated lignosulfonates, or dimerized fatty acids prior to their reaction with the modified polyamines.

3. A method of forming a paving slurry seal mixture of an aqueous bituminous emulsion and mineral aggregate capable of being worked at a temperature above 100° F. comprising: mineral aggregate; from about 8% to about 20% of an oil in water type emulsion, based on the weight of the mineral aggregate, wherein the emulsion is comprised of from about 55% to about 65% bitumen, based on the weight of the emulsion; from about 0.5% to about 2% of a cation-active emulsifier, based on the weight of the emulsion, wherein the emulsifier is obtained by reacting a modified polyamine, formed by a Michael addition reaction of a polyalkylene polyamine with a 1,2-unsaturated acid, with a member of the group consisting of polycarboxylic acids and anhydrides of the following general formulae:

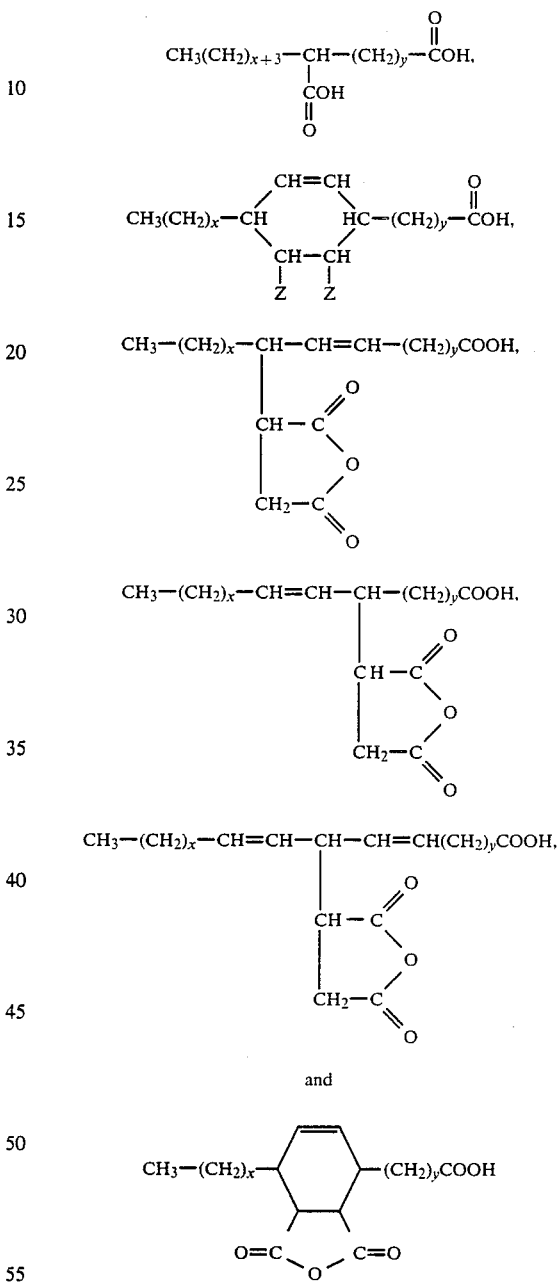

wherein x and y are integers from 3 to 9, x and y together equal 10–14, at least one Z is a carboxylic acid group and any remaining Z is hydrogen, and water to make up 100% by weight of the emulsion; and from about 4% to about 16% water, based on the weight of the aggregate, to form a slurry of the aggregate and the emulsion.

4. The method of claim 3 wherein the emulsifier is obtained by co-reacting the precursors with kraft lignin, desulfonated lignosulfonates, or dimerized fatty acids prior to their reaction with the modified polyamines.

* * * * *

UNITED STATES PATENT AND TRADEMARK OFFICE
CERTIFICATE OF CORRECTION

PATENT NO.  : 4,957,560
DATED       : September 18, 1990
INVENTOR(S) : Perter Schilling It is certified that error appears in the above-indentified patent and that said Letters Patent is hereby corrected as shown below:

In the Abstract, line 7, delete "polyamides" and substitute therefor --polyamines--.

Signed and Sealed this

Twenty-sixth Day of October, 1993

*Attest:*

BRUCE LEHMAN

*Attesting Officer*       *Commissioner of Patents and Trademarks*